(12) United States Patent
Rhoads et al.

(10) Patent No.: US 7,998,728 B2
(45) Date of Patent: Aug. 16, 2011

(54) MULTIPLE TRAY VERMICOMPOSTER WITH THERMAL SIPHON AIRFLOW

(76) Inventors: Ralph Rhoads, Bellingham, WA (US); George Anderson, Portland, OR (US)

( * ) Notice: Subject to any disclaimer, the term of this patent is extended or adjusted under 35 U.S.C. 154(b) by 211 days.

(21) Appl. No.: 12/430,392

(22) Filed: Apr. 27, 2009

(65) Prior Publication Data

US 2010/0273251 A1   Oct. 28, 2010

(51) Int. Cl.
*C12M 1/00* (2006.01)
*C12M 1/02* (2006.01)
*C12M 1/10* (2006.01)
*A01K 29/00* (2006.01)
*B65D 21/00* (2006.01)

(52) U.S. Cl. .............. 435/290.1; 119/6.7; 435/290.3; 435/290.4; 206/507

(58) Field of Classification Search ............. 435/290.1, 435/290.3, 290.4; 119/6.7; 206/507
See application file for complete search history.

(56) References Cited

U.S. PATENT DOCUMENTS

| 3,961,603 | A | * | 6/1976 | Gaddie, Sr. ............... 119/6.7 |
| 5,413,934 | A | * | 5/1995 | Fischer ................ 435/290.1 |
| 6,548,294 | B1 | * | 4/2003 | Ritter et al. ............ 435/290.4 |

* cited by examiner

*Primary Examiner* — Nathan A Bowers
*Assistant Examiner* — Gautam Prakash
(74) *Attorney, Agent, or Firm* — Craig A. Simmermon

(57) ABSTRACT

Multiple Tray Vermicomposter with Thermal Siphon Airflow is a vermiculture composting device that uses earthworms to create compost where worms eat and digest food to excrete compost. It is a multiple tray system with a base and a lid. New compost trays with freshly loaded food and bedding are stacked on top of older trays containing worms and compost to instigate a continuous upward migration of the worms thereby creating continuous compost production. Compost trays have permeable bottoms to allow worms to pass through. Compost production is accelerated from thermal siphon airflow to provide ample airflow to the worms without the requirement of a power source. Light-tight air-permeable connections between trays, lid, and base, also accelerate compost production by keeping the worms completely dark. If worms fall through the bottom compost tray, there exists a ramp to enable the fallen worms to climb back into the bottom compost tray.

1 Claim, 14 Drawing Sheets

MULTIPLE TRAY VERMICOMPOSTER WITH THERMAL SIPHON AIRFLOW

BACKGROUND OF INVENTION

This invention relates to composting devices. Composting is the purposeful biodegradation of organic matter such as yard and food waste to yield effective, natural nutrients for plants in the form of small dark chunks called compost and liquid called worm leachate. The decomposition is performed by micro-organisms like bacteria, yeasts, nematodes, protozoa, and fungi. Composting is naturally a relatively slow process. It could take up to two years, if left alone, for yard clippings and leaves to completely process into good compost. In low temperatures, a number of macro-organisms, such as springtails, ants, nematodes, isopods, and earthworms can accelerate the composting process. These macro-organisms aid the process because compost producing micro-organisms live inside the macro-organisms in large quantities. The large amounts of micro-organisms living in the digestive tracts of these organisms greatly accelerate the composting process. Also, sand particles in the digestive tracts of these organisms mechanically break down waste particles allowing the micro-organisms to consume waste faster. Under the right conditions, macro-organisms can thrive to continuously regenerate, in a controlled way, to eat large quantities of organic matter, allowing the micro-organisms to decompose the matter into compost in relatively short periods of time. This device specifically relates to a "vermicomposter" device which is a composting device that uses earthworms or worms to greatly accelerate the composting process.

Worms require moisture to breathe because they take in oxygen through their skin. They will die if their skin dries out. On the other hand, too much moisture in composting bins will produce unpleasant orders and worms could drown in moisture pockets in the bins. Unpleasant orders result from anaerobic bacteria which naturally crop up in waste material that is too moist. Organisms that accelerate the composting process, living within the worms, are generally aerobic, in that they require oxygen to live. Composting micro-organisms continuously use oxygen from air as a reactant to produce compost. Thus, increased oxygen accelerates the composting process. Anaerobic bacteria inhibit the composting process because they thrive in oxygen free environments and thereby expand such oxygen free areas, which in turn, depletes aerobic organisms, thereby slowing the compost rate. Thus, too much moisture greatly slows the process. On the other hand, too much oxygen, which comes from airflow, could dry out the worms and kill them, as stated above. Therefore there is an optimal balance between moisture and airflow regarding maximum production rate of compost in vermicomposters.

In nature, worms live in the upper surface of the ground at a dept of about 0-2 feet. When they are cold, they instinctually migrate upwards towards the surface of the ground, and when they get hot, they migrate downwards. Additionally, worms dislike sunlight because it dries them, thus worms readily move downward when confronted with sunlight. Additionally, worms migrate to find layers with abundant food supplies. When conditions are within the optimal range, worms do not migrate.

This device plays on these instinctual characteristics of worms to yield maximum compost rates. Specifically, the device consists of a tray system where trays are stacked vertically to form several layers of bins where worms can freely migrate between the bins according to their natural instincts. By controlling the migration between layers, the device produces compost quickly and conveniently.

SUMMARY OF THE INVENTION

It is an aspect of this invention to provide a vermicomposter that provides the optimal balance between oxygen flow and moisture to maximize the vermicomposting process. This device has compost production rate of one bin or tray of compost per 6-12 weeks.

Gases and heat are produced by the composting process. These gases block oxygen from the micro-organisms, which slows the process. Heat slows the process as well because heat dries and kills the worms. Thus, it is another aspect of this invention to provide rapid removal of gases and heat from the device.

Worm leachate is liquid produced by the worms and is not toxic to worms in any way. On the other hand, tap water or garden hose water may have chlorine or other chemicals in it that can be toxic to worms. Thus, worm leachate is a good liquid to reintroduce into the device to strike the optimum balance mentioned above. Also, worm leachate is terrific natural plant fertilizer. Thus, it is an aspect of this invention to include a collection tray that is capable of collecting worm leachate produced from the device which can be conveniently reintroduced to the vermicomposter or simply used as plant fertilizer.

With commercial or other accelerated composting devices, control of these parameters is accomplished typically through the use of outside powered means such as with fans, pumps, powered air flow, water flushing, mechanical aeration, stirring, flipping, powered heating, powered cooling, and the like. However, these means require the addition of outside energy which is undesirable for convenience, economic, and environmental reasons. Thus, it is also an aspect of this invention to control such parameters without the use of an outside power source.

It is another aspect of this invention to provide a vermicomposter that can be readily operated by one person. The device can be easily assembled, lifted, and carried by an average sized person. The device is useful to the average consumer. The device can be placed in a yard, patio, balcony, basement, or the like.

Many composting devices basically consist of one bin. There is a disadvantage to these devices because you cannot add new waste to the bin without disrupting and contaminating the existing composting process in the bin. There is no practical way to add new waste and remove high quality compost from these devices. Thus, it is another aspect of this invention to provide a practical method to add new waste and remove high quality compost from a vermicomposter without disruption of ongoing processes. This is accomplished by a multiple tray system.

The multiple tray system also provides control over worm migration as discussed below. Thus, it is another aspect of this invention to provide worm migration control among several layers of worm habitat within the device.

As stated above, light is undesirable to the composting process. However, in order to generate the required airflow in the device, gaps, holes, or vents are required to provide such. Thus, it is also an aspect of this invention to provide air-permeable and light-tight connections between the trays and other members of this device.

To achieve the optimum balance between airflow and moisture, there exists a minimum and maximum air gap between members to allow optimum flow through the composting areas which is determined by the amount of composting volume in the device. Thus, it is also an aspect of this invention to provide a device with total air or oxygen venting within this range.

It is also an aspect of this invention to have stacking trays with apertures in the bottoms thereof that are appropriately sized to allow proper airflow while retaining the appropriate amount of moisture within the stacking tray.

DEFINITION LIST

Figure 1:
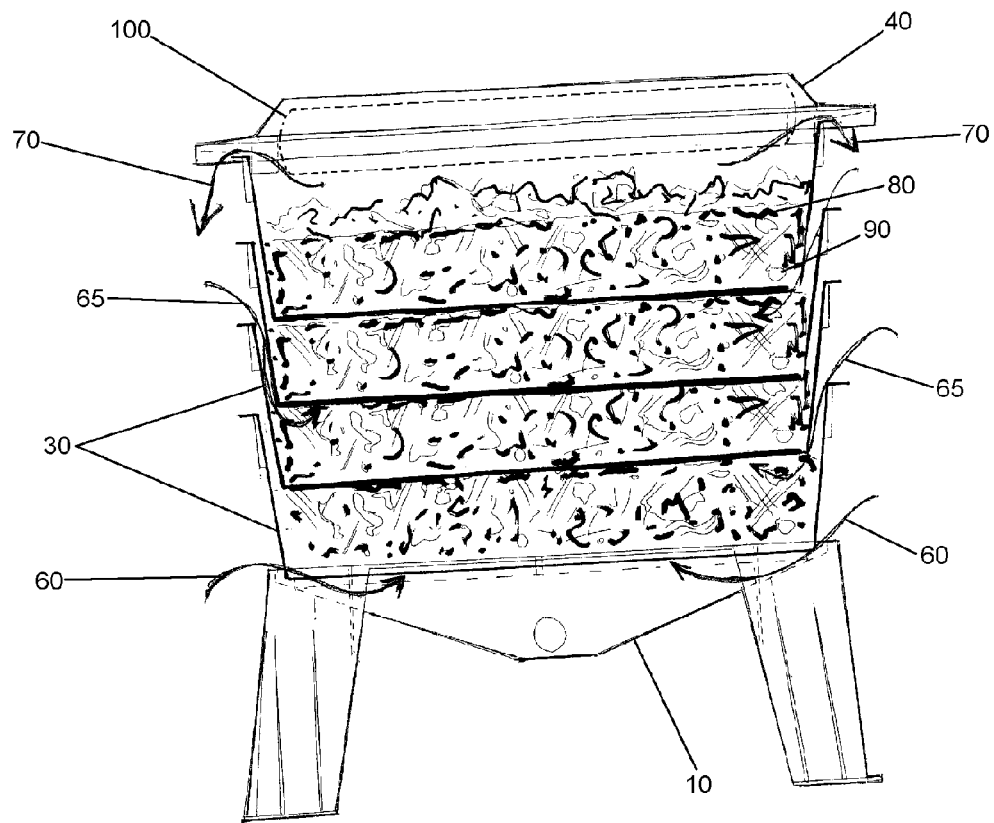
FIG. 1 is a cross sectional view of the invention with depiction of airflows.
Figure 2:
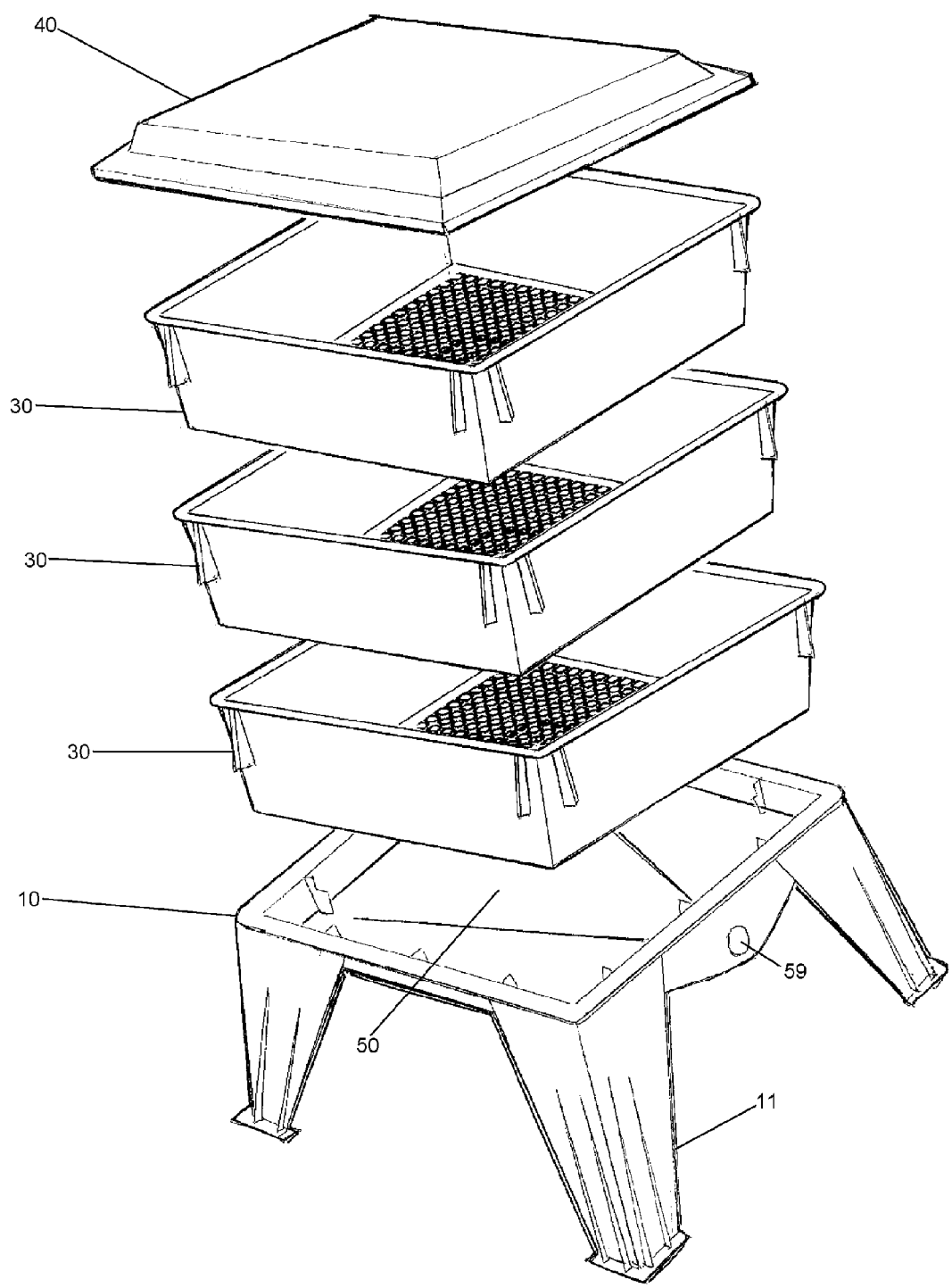
FIG. 2 is an exploded perspective view of the invention in best mode square configuration.
Figure 3:
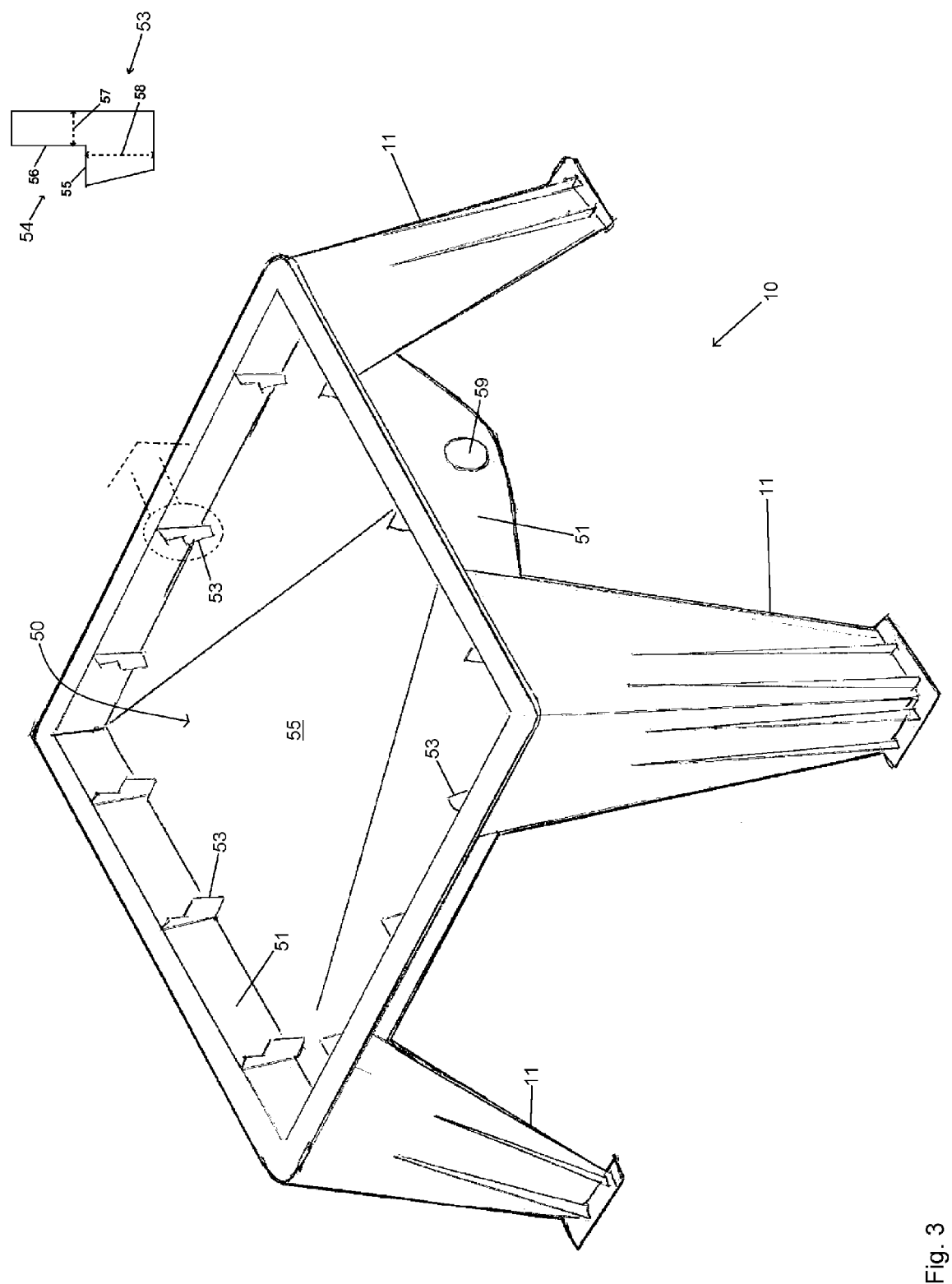
FIG. 3 is a perspective view of the base/collection tray in best mode square configuration with blow-up of support rib with notch.
Figure 4:
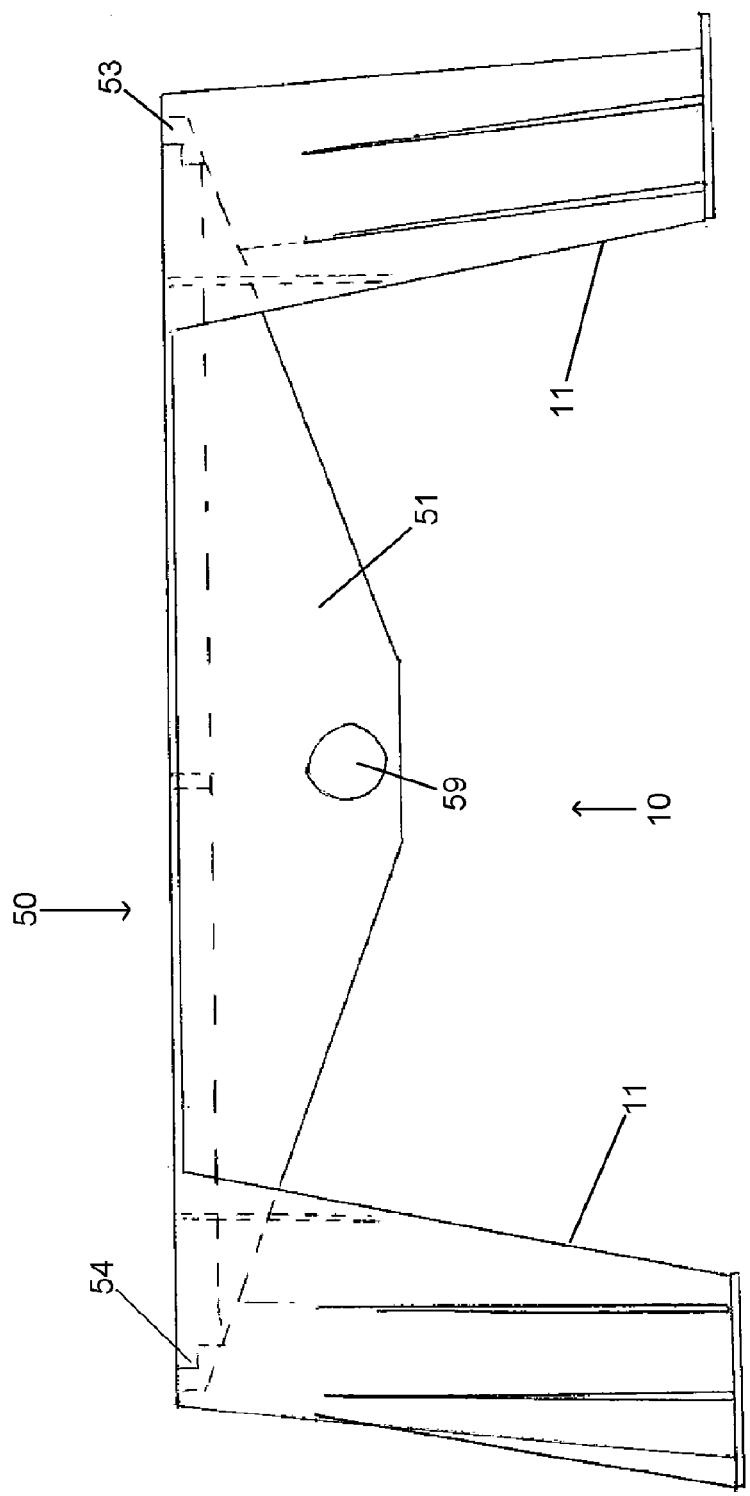
FIG. 4 is a front view of base.
Figure 5:
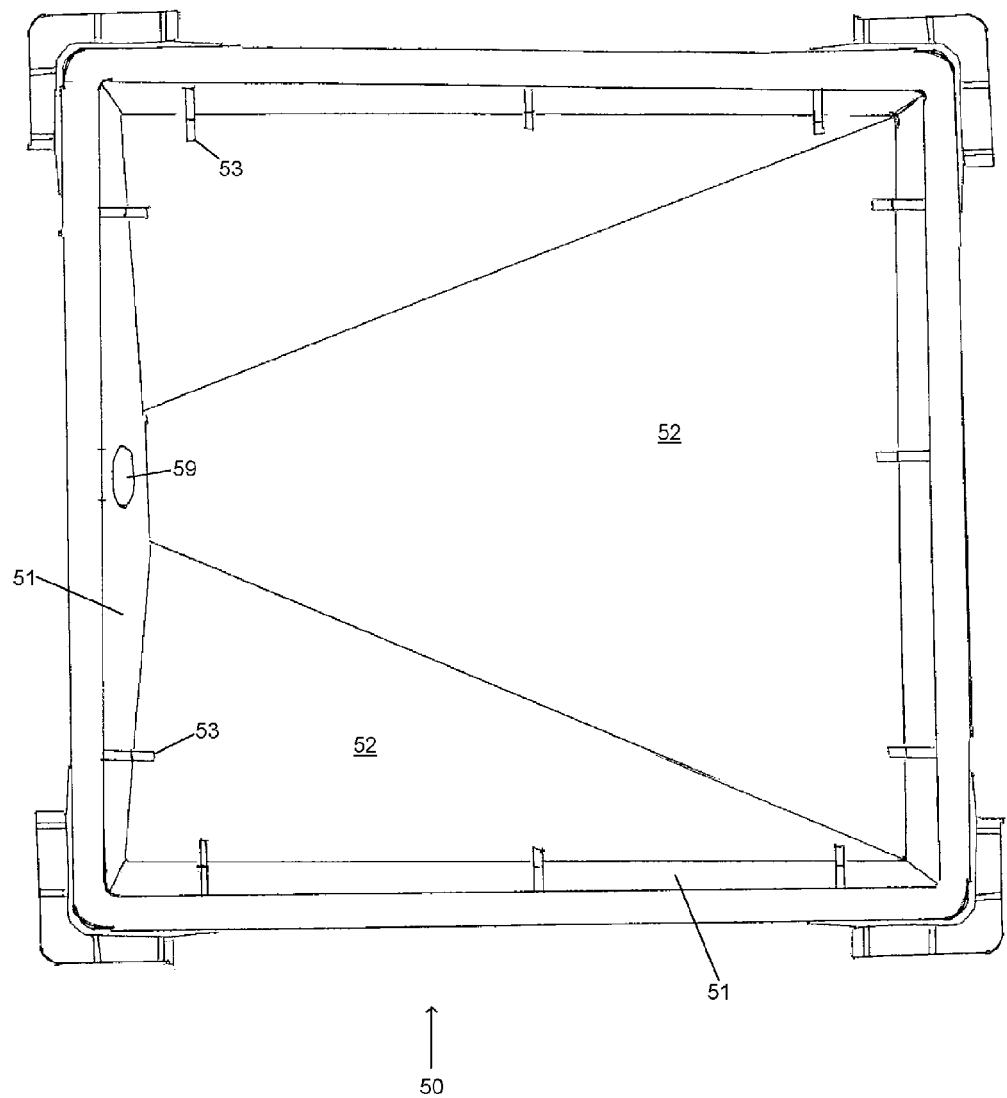
FIG. 5 is a plan view of base/collection tray in best mode square configuration.
Figure 6:
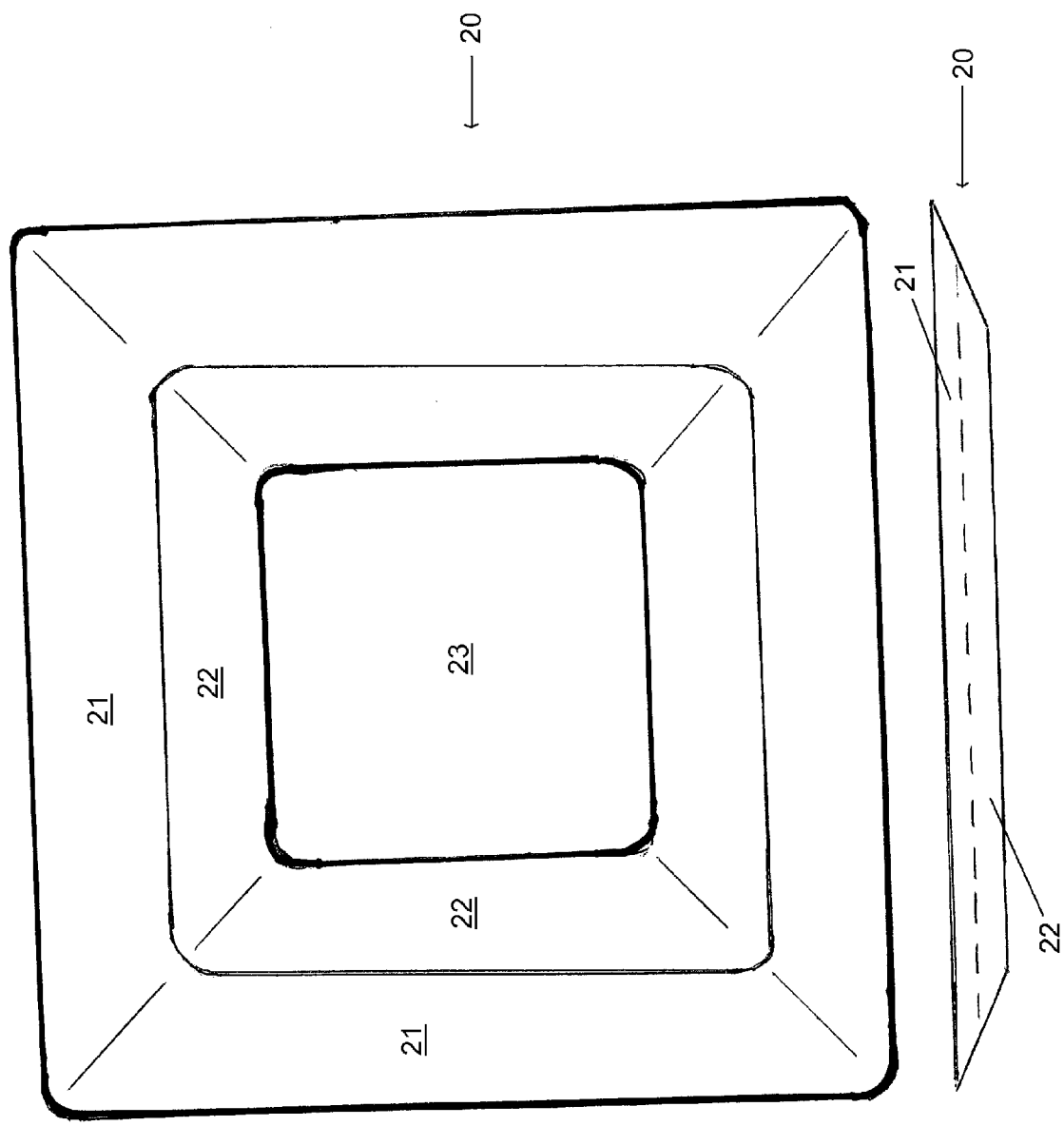
FIG. 6 is a plan view of WORM LADDER® and a cross-section view of WORM LADDER®, both in best mode square configuration.
Figure 7:
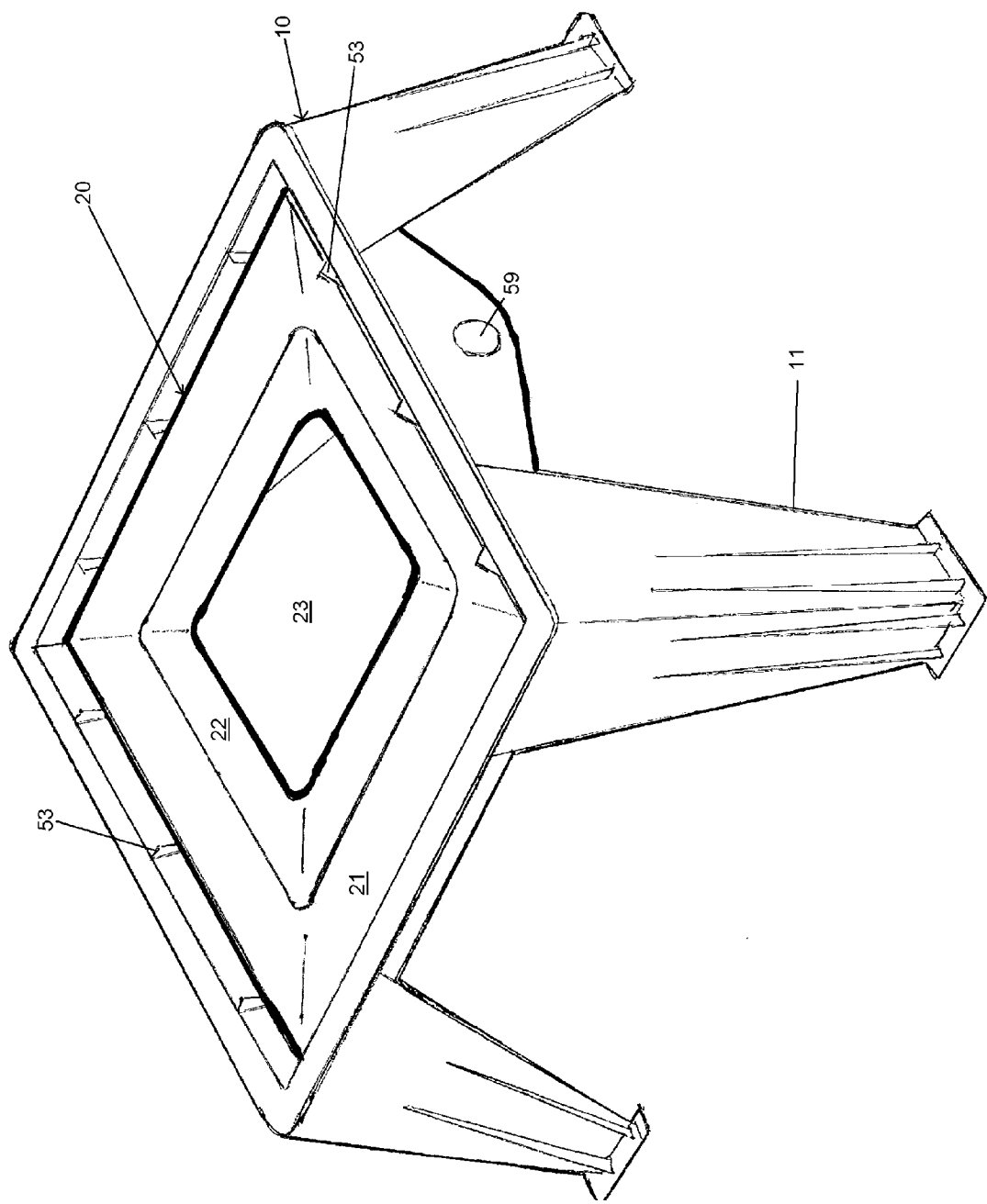
FIG. 7 is a perspective view WORM LADDER® assembled on base both in best mode square configuration.
Figure 8:
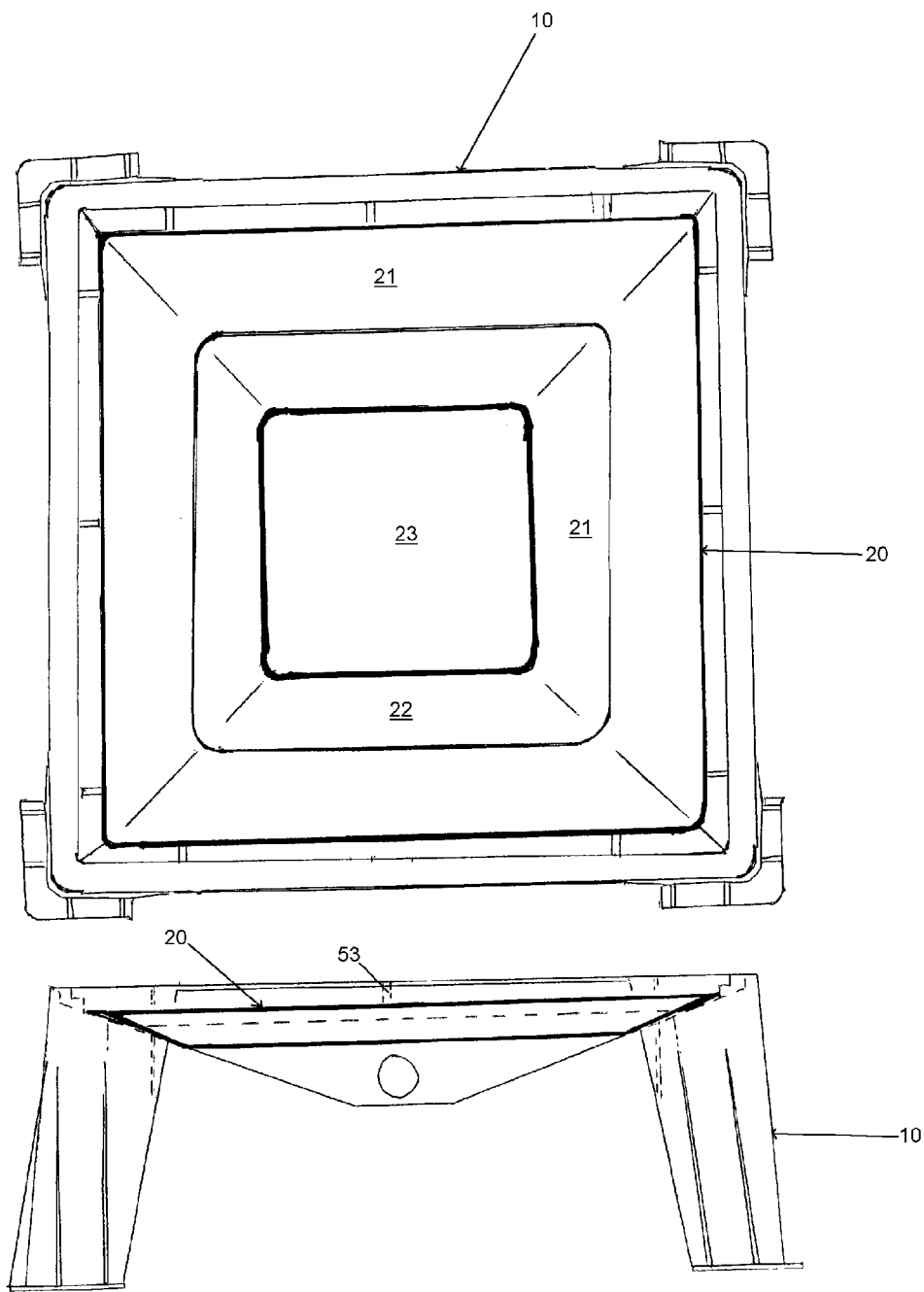
FIG. 8 is plan view of WORM LADDER® assembled on base/collection tray and a cross-section of the same.
Figure 9:
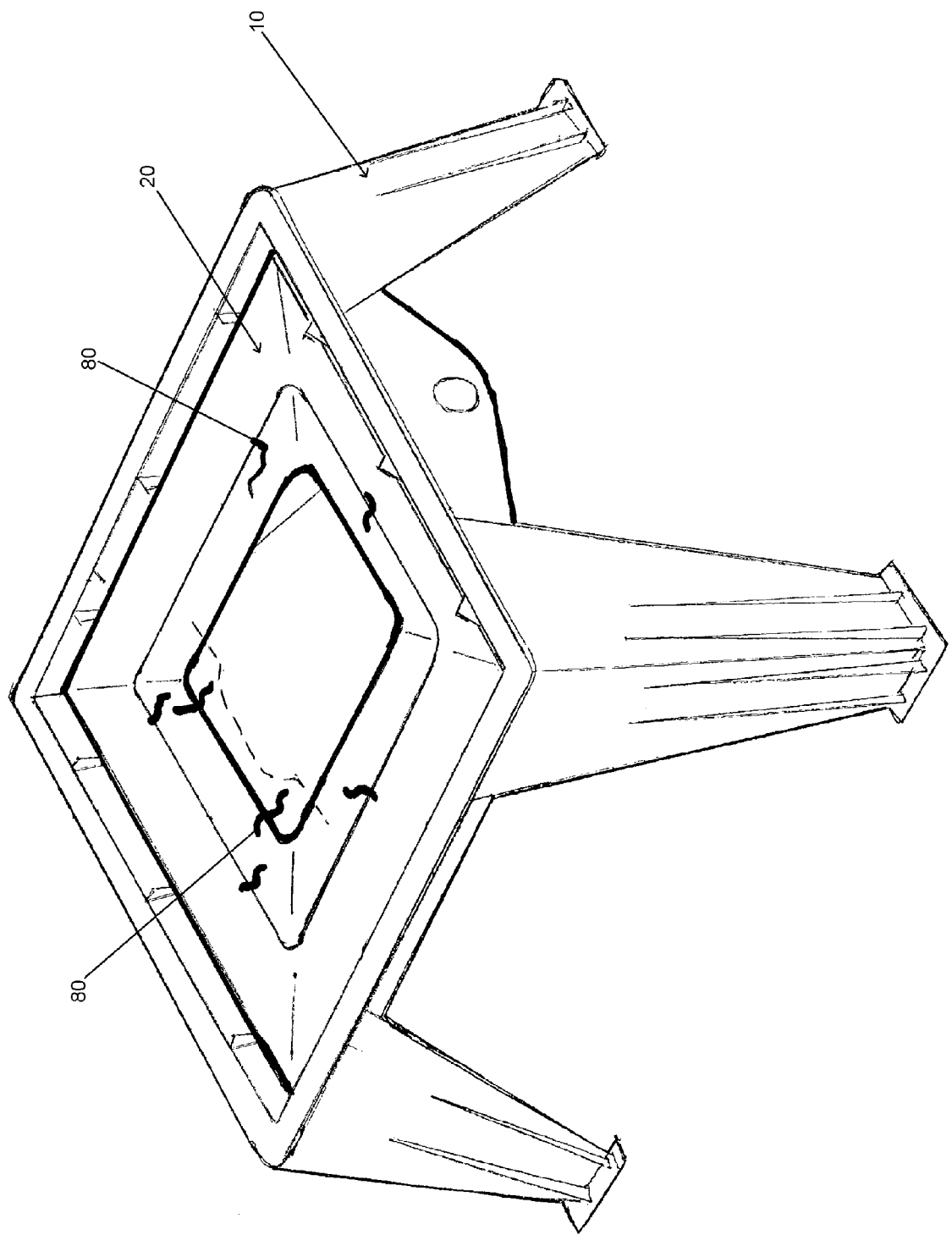
FIG. 9 is a perspective view of WORM LADDER® assembled on top of base/collection tray, in best mode square configuration, depicting how worms can climb up WORM LADDER®.
Figure 10:
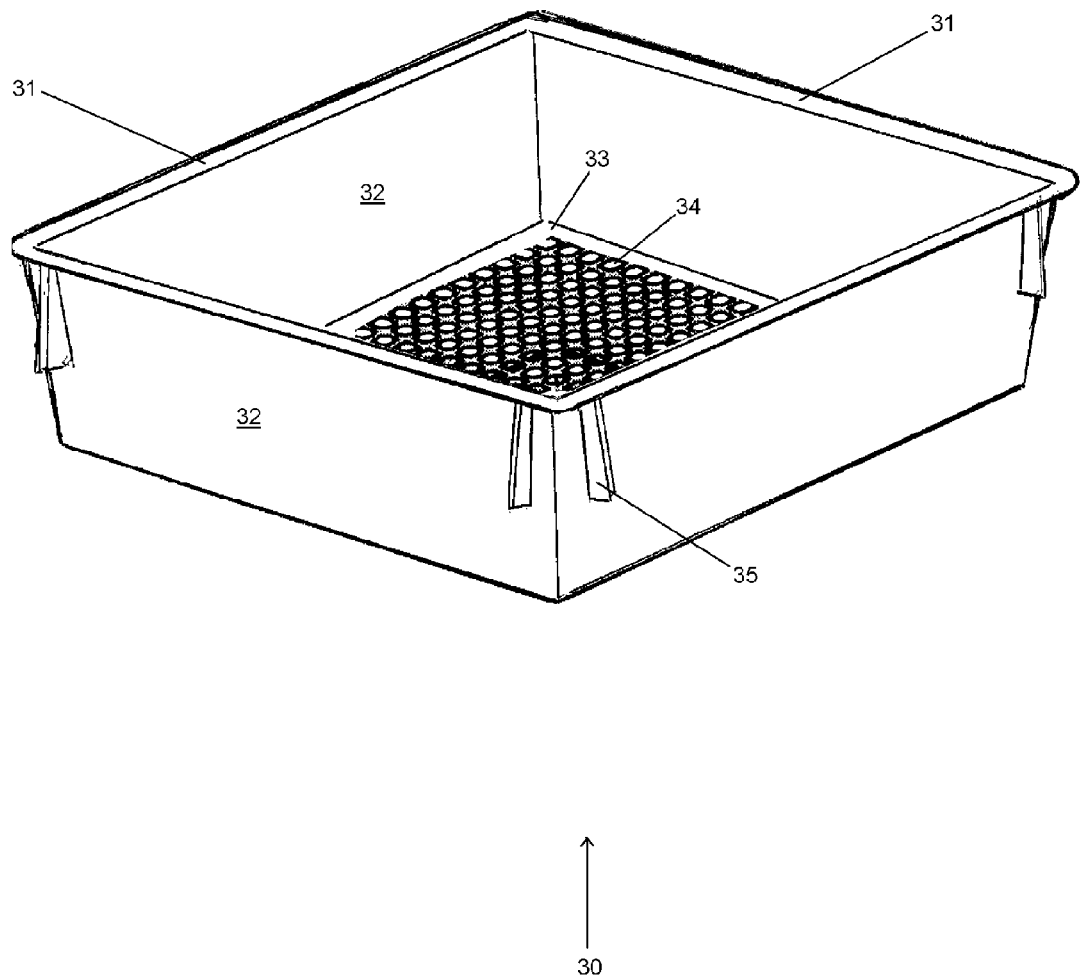
FIG. 10 is a perspective view of a best mode square-shaped stacking tray.
Figure 11:
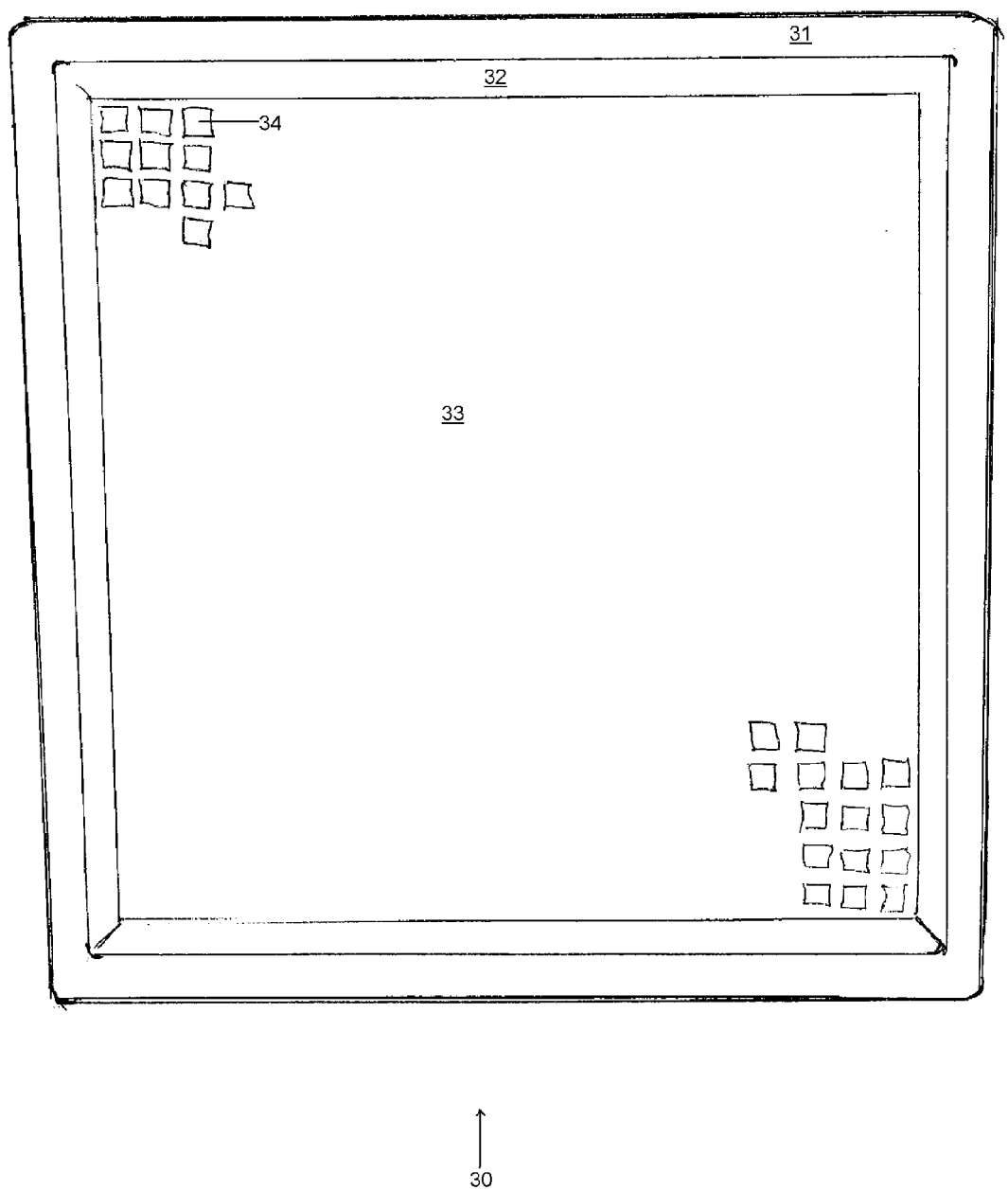
FIG. 11 is a plan view of a best mode square-shaped stacking tray.
Figure 12:
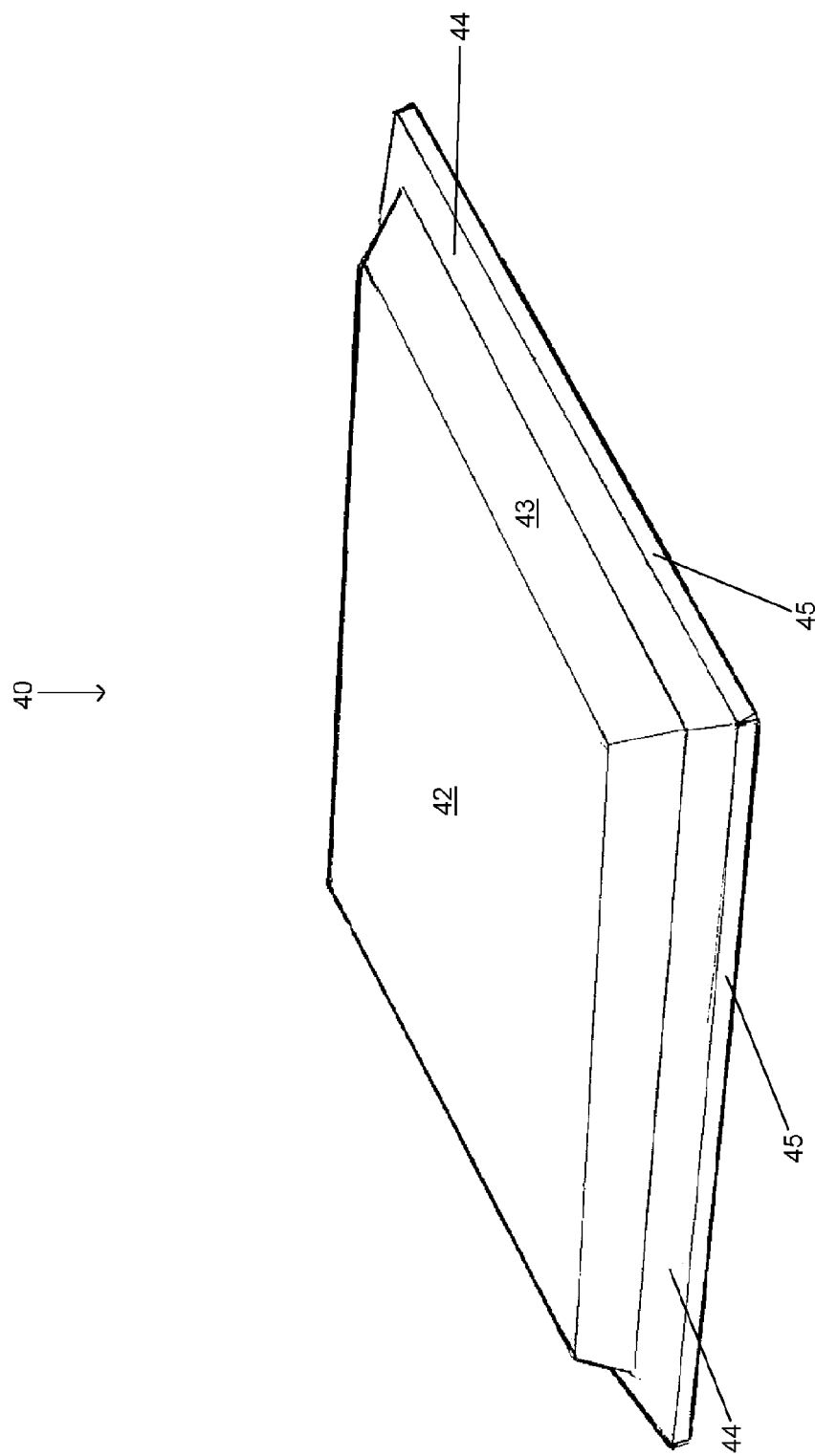
FIG. 12 is a top perspective view of best mode square-shaped light-tight air-permeable lid.
Figure 13:
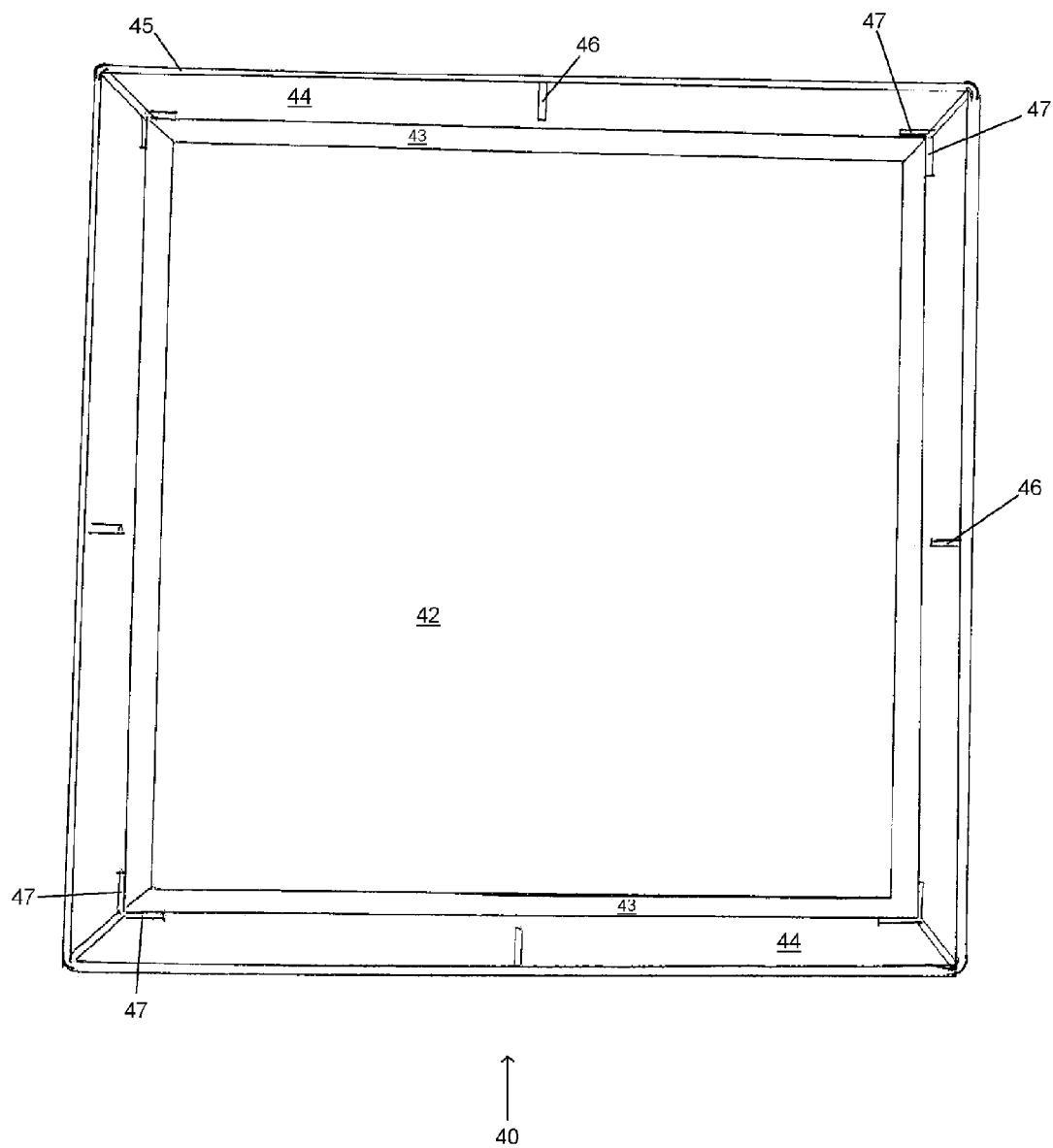
FIG. 13 is a bottom view of best mode square-shaped light-tight air-permeable lid.
Figure 14:
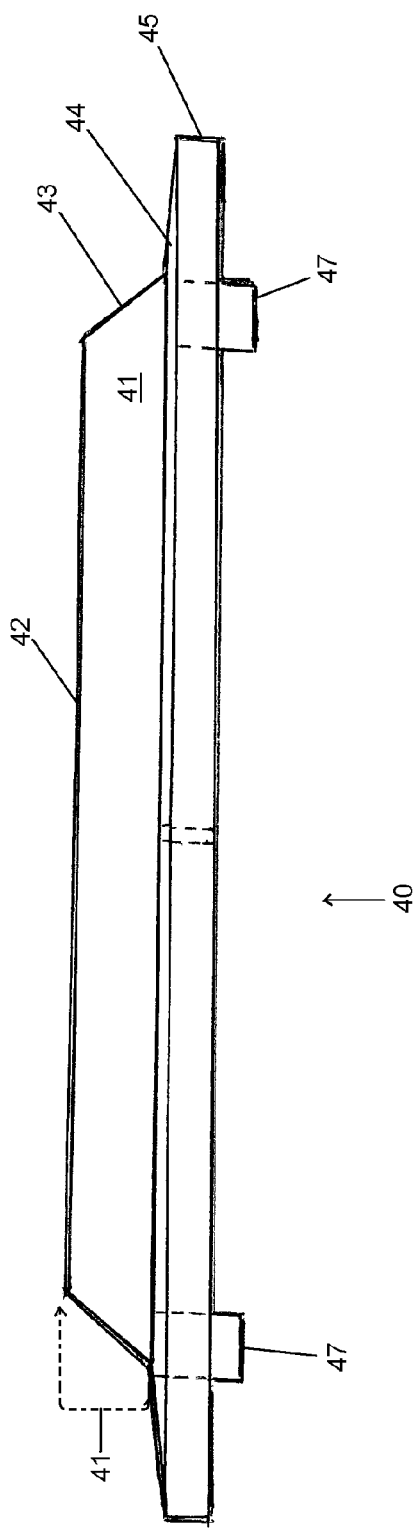
FIG. 14 is a side-view of best mode square-shaped light-tight air-permeable lid.

| Term | Definition |
|---|---|
| 10 | Base |
| 11 | Leg of Base |
| 20 | WORM LADDER ® |
| 21 | Horizontal Flange Area on WORM LADDER ® |
| 22 | Ramp on WORM LADDER ® |
| 23 | Large Void Area in WORM LADDER ® |
| 30 | Stacking Tray |
| 31 | Wide Brim on Stacking Tray |
| 32 | Side of Stacking Tray |
| 33 | Bottom of Stacking Tray |
| 34 | Apertures in Bottom of Stacking Tray |
| 35 | Stacking Ribs on Stacking Tray |
| 40 | Light-tight Air-permeable Lid |
| 41 | Large Dome Area on Lid |
| 42 | Large Flat Area on Dome Area |
| 43 | Steep Sloped Edges on Dome Area |
| 44 | Wide Brim on Lid |
| 45 | Skirt on Lid |
| 46 | Vertical Support Ribs on Lid |
| 47 | Horizontal Support Ribs on Lid |
| 50 | Collection Tray |
| 51 | Side of Collection Tray |
| 52 | Bottom of Collection Tray |
| 53 | Support Ribs in Collection Tray |
| 54 | Notches on Support Ribs in Collection Tray |
| 55 | Bottom Surface of Notch |
| 56 | Side Surface of Notch |
| 57 | Side Vent Distance |
| 58 | Lower Vent Distance |
| 59 | Drain Hole in Collection Tray |
| 60 | Lower Perimeter Air Gap |
| 65 | Lateral Air Flow |
| 70 | Upper Perimeter Air Gap |
| 80 | Worms |
| 90 | Food and Bedding for Worms to Eat and Live In |
| 100 | Thermal Siphon Volume |

DETAILED DESCRIPTION

New compost trays or stacking trays with freshly loaded bedding and food material for worms are stacked on top of older trays. When worms from below are finished eating food or waste from older stacking trays or when they have a taste for fresher larger pieces of waste they migrate upwards. They may also migrate back downward when they have a taste for smaller pieces of waste. Waste pieces are reduced in size as the composting process or worm feeding process continues. Typically worms prefer smaller pieces of waste over larger pieces. Worms generally do not migrate when conditions are in the preferred range. Thus, worms generally remain in a tray until waste is completely depleted into compost without any small chunks of food or waste product. At that time, worms generally migrate upwards to the next newest tray with newer larger chunks of food or waste. The stacking tray system in this regard yields trays with good compost on the bottom and trays with uncompleted compost production toward the top. By the time waste has been completely processed into good compost on the bottom tray, all or most worms have migrated upward to trays above. In this way, completed trays can be separated from non-completed trays and removed form the system without any adjusting any waste, compost, or worms and the like. The system of adding trays and removing trays in this fashion leads to a fast, environmental, and convenient compost production process.

The initial tray must be loaded with food, bedding, and about 500 worms. With this device, worm populations double every three months, so no addition worms need to be loaded into any additional trays or bins. Worms will reproduce and migrate naturally into new trays. When the device is working properly, each tray undergoing the composting process, houses about 3,000 worms. Obviously, the more worms, the faster the production rate of compost, at least up to saturation population, which is more than 3,000 worms per tray. Excess worms are lost with the harvest of the bottom tray which keeps populations below saturation.

It is believed that the "red wiggler" species of worm, Latent name Eisenia Fetida, produces compost at the fastest rate among worm species. Thus, this device is designed to produce optimal conditions for the red wiggler to live in the device. Other species of worms may find the environment of this device to be less than ideal.

The invention comprises: a base 10 with collection tray 10, at least one stacking tray 30, and a light-tight air-permeable lid 40. These members must have generally the same geometric shape as viewed from top elevation because these members must "stack" together or fit together, when assembled vertically, to form light-tight connections between the members of the vermicomposter device. The best mode geometrical shape is square, however other shapes such as circular or other polygonal may be used.

Base 10 is a sturdy base which supports the rest of the device slightly above the surface of the ground, deck, or floor. At this level air may freely flow upwards through and laterally through the device. See FIG. 1. Also, at this level, a container (not shown) may be place below the collection tray 50 so that the collection tray 50 may be drained of a liquid collected in the tray 50, which can be drained by gravity, into the container. The base 10 has at least three legs 11 which support the rest of the device slightly above the surface of the ground, deck, or floor. Legs 11 support and hold steady the rest of the device at essentially a horizontal orientation. Horizontal orientation is required so the fluid, called worm leachate, which is a chemical product of the vermiculture process, can drip down and collect in the collection tray 50, and be retained by the collecting tray 50 or container. Worm leachate forms in the stacking trays 30 and flows downward by gravity, eventually dripping into the collection tray 50. Therefore, all stacking trays 30, collection tray 50, and lid 40 should remain horizontally level when the device is in operation. The at least three legs 11 perform this function. Worm leachate may be used as a very effective natural plant fertilizer or to safely add moisture back to the stacking trays 30.

The upper surface of the base 10 forms the collection tray 50. Thus, the collection tray 50 is integral to the top surface of the base 10. The collection tray 50 comprises: a set of sides 51, a bottom 52, a set of support ribs 53 with notches 54, and is open on the top to form a liquid-tight container. The set of sides 51 collectively forms essentially a continuous polygonal or circular wall member, where sides are contiguously joined at their sides, surrounding the perimeter of the bottom 52. Bottom 52 is generally horizontal member with similarly shaped perimeter to the set of sides 51. The set of sides 51 and bottom 52 form the open top container or well. The sides 51 and bottom 52 are solid members without holes or apertures to yield a liquid-tight container. Sides 32 have height sufficient to hold about 2-3 weeks production of worm leachate from several stacking trays and also allow for the required air gap 60 (described below) beneath the bottom surface of the lower stacking tray 30 or WORM LADDER® 20. Collection tray bottom 52 may have slightly non-horizontal surfaces or contours that create downward grades in the bottom surface leading to a low point in the container structure, where, generally, a hole in the container structure may be located. This drain hole 59 is used to drain the collection tray 50. A drain valve (not shown) may be installed into drain hole 59 to control the drain flow of worm leachate stored in the collection tray 50 or drain hole left open to drain into container without valve to ensure maximum air gap (discussed below). Worm leachate may be used to fertilize or re-introduce moisture into the device. Or drain hole 50 is simply left open to drain into container below.

To assemble the device, the base 10 is placed on the ground, deck, or floor with its collection tray 50 facing upwards and positioned horizontal. The WORM LADDER® 20 is then placed inside the collection tray 50, with WORM LADDER® 20 also in horizontal orientation, nested within a pocket of notches 54 (described below). The purpose of the WORM LADDER® is to provide "a ladder" for worms to use to climb back up into the lower stacking tray 30 after the worms have fallen through an aperture 34 down into collection tray 50. Worms fall through from time to time during the vermiculture process. WORM LADDER® is a registered trademark owned by Anderson Die & Manufacturing Company and its use for commercial purposes is strictly prohibited by law without consent from Anderson Die & Manufacturing Company.

One mode of the invention further comprises a WORM LADDER® 20. WORM LADDER® comprises: a horizontal flange 21, at least one ramp 22, and large void area 23. Horizontal flange 21 is the upper most portion of the WORM LADDER® 20 and is essentially a flat flange member in the same shape of a stacking tray 30, with the same number of sides or circular, as viewed from plan view. Horizontal flange 21 has a large void area 23 in the center to allow air flow through the WORM LADDER® 20. With square stacking trays 30, flange 21 is shaped like a square rim member. Ramps 22 are coupled to the inner edge of flange 21. Ramps 22 are planar and coupled at one edge to the inner edge of the horizontal flange 21. Ramps 22 may lead down from the flange 21 to rest on bottom 52 of collection tray 50. Thus, the edge opposite the flange edge may touch bottom 52. Ramps 22 may be coupled to flange 21 by a bendable or hinged connection. Thus, ramps 22 may be bent downward during installation of WORM LADDER® 20 to ensure that all ramps 22 actually rest on bottom 52. There must be ample clearance around the other ramp edges to allow clearance for hinge action of multiple ramps at once and provide clearance for minimum air gap (described below). One mode of ramp 22 for a square system is trapezoidal planar, with the long parallel edge coupled to inner edge of flange 21. Best mode ramps 22 are attached to each other at their short edges. Thus, ramps 22 form a rim shaped member as well. With this mode, the minimum air gap must exist completely under the WORM LADDER® 20 to allow for the required airflow. Thus, the minimum air gap must exist between the upper surface of worm leachate sitting in the collection tray 50 and the lower surface of the WORM LADDER® 20 at all times to allow for the required air flow. Thus, ramps 22 do not touch bottom of collection tray in best mode. Worms can span a small air gap of at least one inch or so.

A stacking tray 30 may then loaded with bedding and food and placed on the WORM LADDER® 20. In the case of the initial stacking tray used to start the device, an initial deposit of starter worm must be made. A stacking tray 30 comprises: a wide brim 31, a set of sides 32, a bottom 33, and is open on the top. The set of sides 32 surrounds the entire perimeter of the bottom 33 where sides 32 collectively form essentially a continuous polygonal or circular wall member, where said sides are contiguously joined at their sides, surrounding the perimeter of the bottom 33. Joined at the top of sides 32 is wide brim 31, which is a flange member that has horizontal flange surface generally perpendicular to the sides32, where flange member 31 extends radially outward from sides 32 to an outer edge. Wide brim 31 runs along the entire perimeter of the upper surface of the stacking tray 30. With best mode square stacking trays, wide brim 31 is a square rim member. Wide brim 31 is required to add structural integrity to the stacking tray 50 which would otherwise be somewhat flimsy as a result of the open-top configuration of the member. The bottom 33 of the stacking tray 30 is generally horizontal and acts as a bottom support member for material that is loaded into the tray. Bottom 30 has many apertures 34 in it that are sized to allow the free passage of air between the apertures 34 while still keeping in tact bedding and food within the tray 30. Apertures 34 are also sized to allow worm leachate to freely drip through apertures 34. Compost and worms can sometimes fall through apertures 34. Best mode bottom 33 includes apertures 34 sized at about 0.25" square and are positioned throughout the entire bottom area to provide free flow of air throughout the bottom area. The sides 32 of the stacking trays 30 are solid to prevent the passage of light into the trays. As stated above, light shining directly onto the worms, bedding, or food substantially disrupts the vermicomposting process and is undesirable. Sides 32 of stacking trays have height appropriate to load several alternating layers of bedding and food inside of a tray, each layer ranging from 1-4" thick with empty air space of at least a few inches at the top of the tray. All sides 32 of a tray 30 must have the same height. The best mode height of side 32 or depth of a stacking tray 30 is about 5". This depth of stacking tray was chosen because it yields an overall assembled device size that is easily handled by one person while large enough to allow for substantial compost production.

When a stacking tray 30 is placed on the WORM LADDER® 20, the tray "nests" slightly within base 10 in a stable position where the bottom surface of the stacking tray 30 sits slightly below the top surface of base 10. Thus, the stacking tray 30 rests slightly inside collection tray 50. This arrangement prevents any light shining on the side of the vermicomposter from shining inside a stacking tray 30 system.

There is a perimeter air gap 60 around the entire perimeter of the connection between base 10, WORM LADDER® 20, and bottom stacking tray 30 that allows the free flow of air from outside of the device to the inside of the stacking trays through gap 60 and apertures 34. This gap is the lower perimeter air gap 60. The lower perimeter air gap 60 is sized to provide an air flow generated by thermal siphon (see blow) that yields an optimal temperature range of about 60-80° F. with moisture range of about 60-80% inside of the collection trays 30 with the device loaded properly and placed in a cool, dry, shaded place such as barn, shed, porch, basement, garage, or other location with ventilation and shade from sunlight. The device is not designed to be placed in direct sunlight or rain. Air gap vent 60 allows for free airflow through the device without any appreciable sheer forces acting on the air as it flows through air gap vent 60.

Air flow is created by a thermal siphon effect where heat and gasses are generated inside of the tray from the composting process. These hot gasses naturally travel upwards thereby pulling cooler air from below along with it, creating a general upward flow of air. The larger the area of bottoms 34 with apertures 34 of the stacking trays 30, the larger the air gap required to provide ample air flow to yield maximum compost rate. Experimentation has determined that the total area of air gap must be at least three percent of the bottom area 34 in the stacking tray for a 5-stacking tray embodiment. Best mode allows for a stacking tray with a 14.25" by 14.25" loading area and an air gap of 0.25" around the full length of the perimeter of the bottom of tray 30. Thus, there must be a least a 0.25" arc gap around the entire bottom surface of the lower stacking tray in one embodiment or the entire bottom surface of the WORM LADDER® to allow proper airflow. These dimensions yield an air gap that is about 3.5% of the area of bottom 34. This arrangement yields a light-tight air-permeable connection between the base 10 and stacking tray 30 with WORM LADDER® 20 as an intermediate member.

The lower perimeter air gap 60 is accomplished with the set of support ribs 53 which are located on the upper surface of the base 10 which is collection tray 50. Support ribs 53 are vertically oriented rectangular planer members that stand perpendicular to the inner surface of sides 51 of collection tray 50. Support ribs 53 are joined at their outside edge to sides 51 to form a T-connection with side 51. Support ribs 53 act as small support columns positioned around the edge of the collection tray 50. Support ribs 53 rise to the same level as the top surface of the base 10, thus height of ribs 53 is equal to height of sides 51. Ribs have width running in the direction perpendicular to the inner surface of sides 51. At least one support rib 53 per side 32 of stacking tray 30 is required to keep the tray supported level. Thus, with best mode square-shaped stacking trays 30, at least four support ribs 53 are required in the collection tray 50. The current best mode base 10 uses 2-3 support ribs 53 per side 32 which yields more than ample support for several loaded stacking trays 30 and lid 40.

There is a notch 54 sectioned out of the upper inner corner of each support rib 53. A notch 54 is an L-shaped void in the upper inner corner of each support rib 53. Each notch defines on the rib: a notch bottom surface 55, a notch side surface 56, a side vent distance 57, and a lower vent distance 58. Notches 54 and ribs 53 are appropriately positioned and sized so that the bottoms of the particularly shaped of the WORM LADDER® 20 and stacking trays 30 fit inside a "pocket" formed collectively by all notches 54 in ribs 53. The pocket aligns base 10, WORM LADDER® 20, and stacking tray 30 in concentric position. As stated above, to be stackable, WORM LADDER® 20 and stacking trays 30 must have similarly shaped footprints. Thus, with best mode square stacking trays 30, the pocket formed by notches 54 and ribs 53 is also square-shaped.

The lower perimeter air gap 60 provides an airflow path beneath the WORM LADDER® and into the stacking tray apertures 34. This is accomplished as follows. The WORM LADDER® 20 sits on notch bottom surfaces 55. Thus, there exists an air gap between the outer edges of the WORM LADDER® 20 and the inner surfaces of sides 51 where this gap is at least side vent distance 57. Below the WORM LADDER® 20, there exists a gap between the lower surfaces of the WORM LADDER® 20 and the upper surfaces of bottom 52 where this gap is at least lower vent distance 58. Thus, with a minimum air gap requirement of 0.25", dimensions 57 and 58 must be at least 0.25" to allow adequate airflow for maximum compost production. Lower vent distance 58 must also be large enough to allow for the minimum air gap to exist above the surface of worm leachate collecting in the collection tray 50.

The bottom stacking tray 30 is supported vertically by WORM LADDER® 20, which is supported by notch bottom surfaces 55. The bottom stacking tray 30 is supported laterally by notch side surfaces 56. The WORM LADDER® and stacking tray sit in notches 54 of the ribs 53 which are the sole means of support for these members. Ribs can be 0.0625-0.25" thick. Best mode ribs 53 are about 0.125" thick because this is about the thinnest ribs can be while still providing more than ample structural support for several loaded stacking trays 30 and lid 40. This support means yields the lower perimeter air gap 60 between the bottom of the WORM LADDER® 20 and the inner surfaces of the sides 51 and upper surfaces of bottom 52 of the collection tray 50. Technically, the air flow through the lower perimeter air gap 60 is obstructed by the support ribs 53, however, since ribs 53 are relatively thin, only 0.125", the obstruction is negligible, and there is no appreciable sheer force on the air flow.

Another loaded stacking tray 30 is placed on top of the first loaded stacking tray 30. As many as 10 loaded stacking trays may be used. When a tray 30 is loaded, food and bedding layers typically rise at least to about the half-way point of side 32 of tray 30. With the best mode 5" deep stacking tray 30, the layers may rise to about 3" in the tray 30. Thus, when a second or top tray 30 is stacked on the first or bottom tray 30, the bottom surface of the second tray 30 actually sits on top of and is supported by the food and bedding loaded in the first tray 30. Stacking trays 30 are kept concentric as they are vertically stacked because the bottom of one snuggly fits inside the top of the other where stacking trays 30 are identically shaped. By loading and stacking the trays 30 in this fashion, an air gap remains around the perimeter of the connection between the stacking trays 30. This air gap is similar to the perimeter air gap described above however the gap may be smaller here. This is because the primary airflow should remain in an upward direction for maximum compost rate; however, some lateral air flow 65 is desirable to provide bedding aeration. Thus, gaps exist around all perimeters of all connections between members of this device.

In best mode, stacking trays 30 have stacking ribs 35 on the outside surfaces of the sides 32. Ribs 35 protrude essentially perpendicularly out of sides 32. Stacking trays 30 should have at least one rib 35 per side 32. Ribs 35 provide support between stacking trays 30 when they are stacked while empty and unloaded. The trays 30 would tend to stick together without ribs 35. When stacked in this fashion, the bottom surface of bottom 33 of top tray 30 fits within the open top of the bottom tray 30 and slides into the bottom tray until a rib 35 on the top tray abuts against the upper surface of wide brim 31 of the bottom tray. Stacking is necessary to reduce the overall shipment size of the device and for convenience of storage.

The light-tight air-permeable lid 40 is used to cover the upper most stacking tray and provide a light-tight air-permeable cover for the device. The lid comprises: a large dome area 41, a wide brim 44, a skirt 45, a set of vertical support ribs 46, and a set of lateral support ribs 47. Large dome area 41 of the lid 40 extends above the brim 44 and is the upper most portion of the lid 40. Large dome area 41 has an inner or lower surface which forms a large general concave downward shape and an outer or upper surface. The upper surface of dome area 41 is the upper most portion of the device. Large dome area 41 may have a large flat area 42 on top, with gentle downward and outward grade to allow drainage of rainwater and the like off the top surface of the member, and steep sloped edges 43 leading downward to the wide brim 44. Large dome area 41 forms a space where hot air and other hot gasses collect. The length and width or area of the large dome area 41 should match those of the bottom 33 of stacking trays 30. Thus, there should be dome space above the entire bottom 33 of the upper stacking tray 30. This space is required to ensure the thermal siphon air flow action described above. The dome space allows a relatively large portion of the warmest air and gasses in the device to collect at the top of the device. This warm air "primes" the thermal siphon pump action and keeps the flow of air moving in the general upward direction. The large dome area 41 enables an upward airflow without the use of fans or pumps.

An upper perimeter air gap 70 is required around lid 40 to maintain general upward airflow. Thus, there must be a perimeter air gap 70 of at least three percent of the total bottom area 52 of a stacking tray 50 to ensure adequate air flow. As stated above, the best mode perimeter air gap is 0.25" which corresponds to the best mode bottom 52 which is 14.25" square.

The upper perimeter air gap 70 is accomplished by the set of vertical support ribs 46 and the set of lateral support ribs 47. Vertical support ribs 46 are horizontally oriented rectangular planar members that are joined at their upper edge to the bottom surface of wide brim 44 of support lid 40. Vertical support ribs 46 support lid 40 above the upper most stacking tray 30 at the required distance to yield the appropriate air gap. This means that ribs 46 must have a minimum height that is no less than the required air gap size. Best mode vertical support ribs 46 support the lower surface of lid brim 44 about 0.25" above the upper surface of tray brim 31. Thus, vertical support ribs 46 are about 0.25" in height. Vertical support ribs 46 are oriented radially outward from the center of the lid 40. The width of ribs 46 must be equal to or wider than the width of wide brim 31 on a stacking tray to form the air gap. As with the large dome area 41, the wide brim of the lid 44 may have a slight downward and outward grade on its upper surface to allow drainage of rainwater and the like. Thus, with a graded brim 44, vertical support ribs 46 would have to be slightly taller than the required air gap distance in order to ensure that the minimum gap exists along the full width of the stacking tray brim 31. The height of best mode vertical support ribs 46 on lid 40 with downward grade brim 44 is about 0.375". There must be at least one vertical support rib 46 per side of stacking tray 30. Best mode allows for one vertical support rib 46 per side with the addition of one vertical support rib 46 in each corner of the square-shaped stacking tray 30. Thus, in best mode, there are eight vertical support ribs 46 on lid 40. The use of extra ribs helps ensure that the minimum air gap remains around the entire perimeter of the lid.

Wide brim 44 of the lid 40 must completely cover wide brim 31 of stacking tray 30 in order to create the light-tight seal. Otherwise, light could shine directly downward into the food and bedding through a gap that would exist between the outer edges of the lid 40 and the inner surfaces of the sides 32 of tray 30. Both brims 31 and 44 are essentially horizontal, noting that lid brim 44 made have slight downward and outward grade. Wide brim 44 of lid 40 sits above wide brim 31 of the tray 30 with lid 40 placed on the device. Thus, to provide complete cover, wide brim 44 should be slightly wider than wide brim 31 to provide a overhang ledge to keep light from shining directly down in the upper stacking tray 30.

Skirt 45 is required to prevent light from shining laterally into upper stacking tray 30 through the air gap between lid brim 44 and tray brim 31. The skirt 45 is added to block this light. Skirt 45 is generally a vertical rim member and is attached to wide brim 44 of lid 20 at its upper edges. Skirt 45 hangs downward from the outer edges of brim 44 around the entire perimeter of the brim 44. In order to block the lateral light, brim 44 must have length at least equal to the air gap between brims. Best mode skirt length is about 0.25-0.375". Vertical support ribs 46, which extend radially outwards, are joined at their outer ends to the inner surfaces of skirt 45. This adds structural integrity to ribs 46 and skirt 45.

The minimum upper perimeter air gap 70 must also exist between the inner surfaces of skirt 45 and the outer surfaces of stacking tray 30, which is the outer edge of wide brim 31. Otherwise, skirt 45 would choke down on tray brim 31 and impede the airflow to disrupt the composting process. Thus, lid wide brim 44 must extend wider than that of stacking tray brim 31 by at least the amount of the minimum air gap distance. Lid brim 44 must extend beyond tray brim 31 to yield perimeter air gap 70 between the skirt 45 and the tray brim 31. The thickness of the material of the lid 40 must also be taken into account. Thus, with best mode air gap of about 0.25" and lid material thickness of about 0.125", where the best mode tray brim is 0.75" wide, best mode lid brim 44 has width of about 1.125". In this way, wide brim 44 of the lid 40, skirt 45, and vertical support ribs 46 yield a light-tight air-permeable connection.

Lid 40 must be kept concentric with the upper stacking tray 30 to keep air gap 70 continuous and constant around the perimeter of the connection. Horizontal support ribs 47 help guide and hold lid 40 into a concentric position with the upper stacking tray 30. Horizontal support ribs 47 should have height greater than that of the vertical support ribs 46 because horizontal support ribs 47 must extend slightly down into the upper most stacking tray 30 so that the horizontal support ribs 47 slide against the inner surfaces of sides 32 when moved laterally into a non-concentric position. Thus, horizontal support ribs 47 act as prongs to funnel the lid into concentric position as the lid 40 is placed on top of the upper tray 30.

Horizontal support ribs 47 are best positioned at all corners of the particularly shape of stacking tray 30. Thus with best mode square shaped stacking trays, there should be 4 horizontal support ribs 47. With circular stacking trays, which do not have corners, horizontal support ribs 47 may be position at the four quadrants of the circular shape.

What is claimed is:

1. A vermicomposter comprising: a base; a worm ladder member, at least one stacking tray; and a light-tight air-permeable lid,
   wherein said base, said worm ladder member, said at least one stacking tray, and said light-tight air-permeable lid all have a horizontal cross-sectional shape similar to each other,
   wherein a bottom of said at least one stacking tray is disposed within a top of said base; a top of said at least one stacking tray is disposed within a bottom of said light-tight air permeable lid;
   and said worm ladder member is disposed within the top of said base and in between said base and said at least one stacking tray, wherein said worm ladder member comprises: a horizontal flange, a void area, and at least one inclined plane connecting the horizontal flange and the void area.

\* \* \* \* \*